W. J. MARTIN.
SAFETY DEVICE.
APPLICATION FILED MAR. 21, 1917.
1,428,966.
Patented Sept. 12, 1922.
4 SHEETS—SHEET 3.
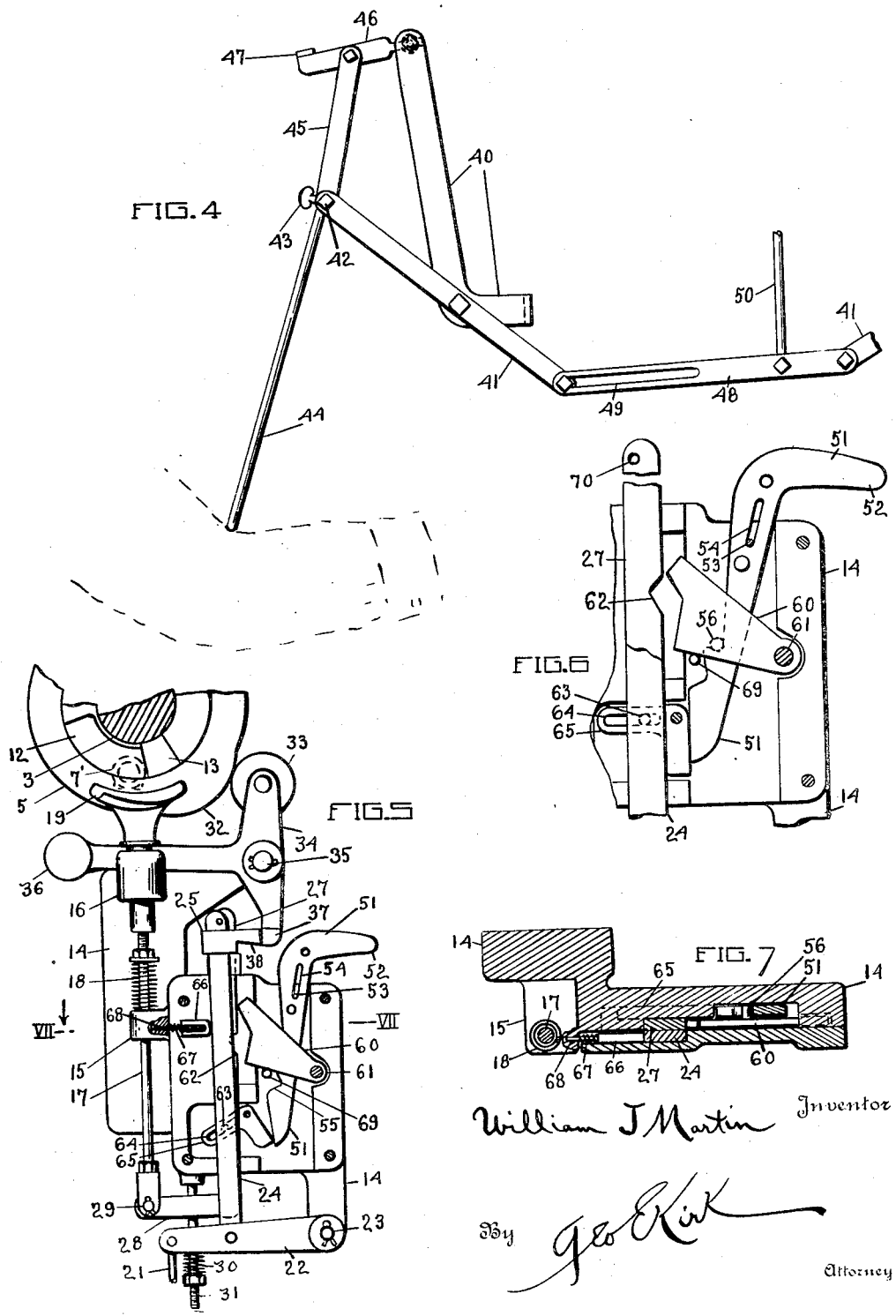

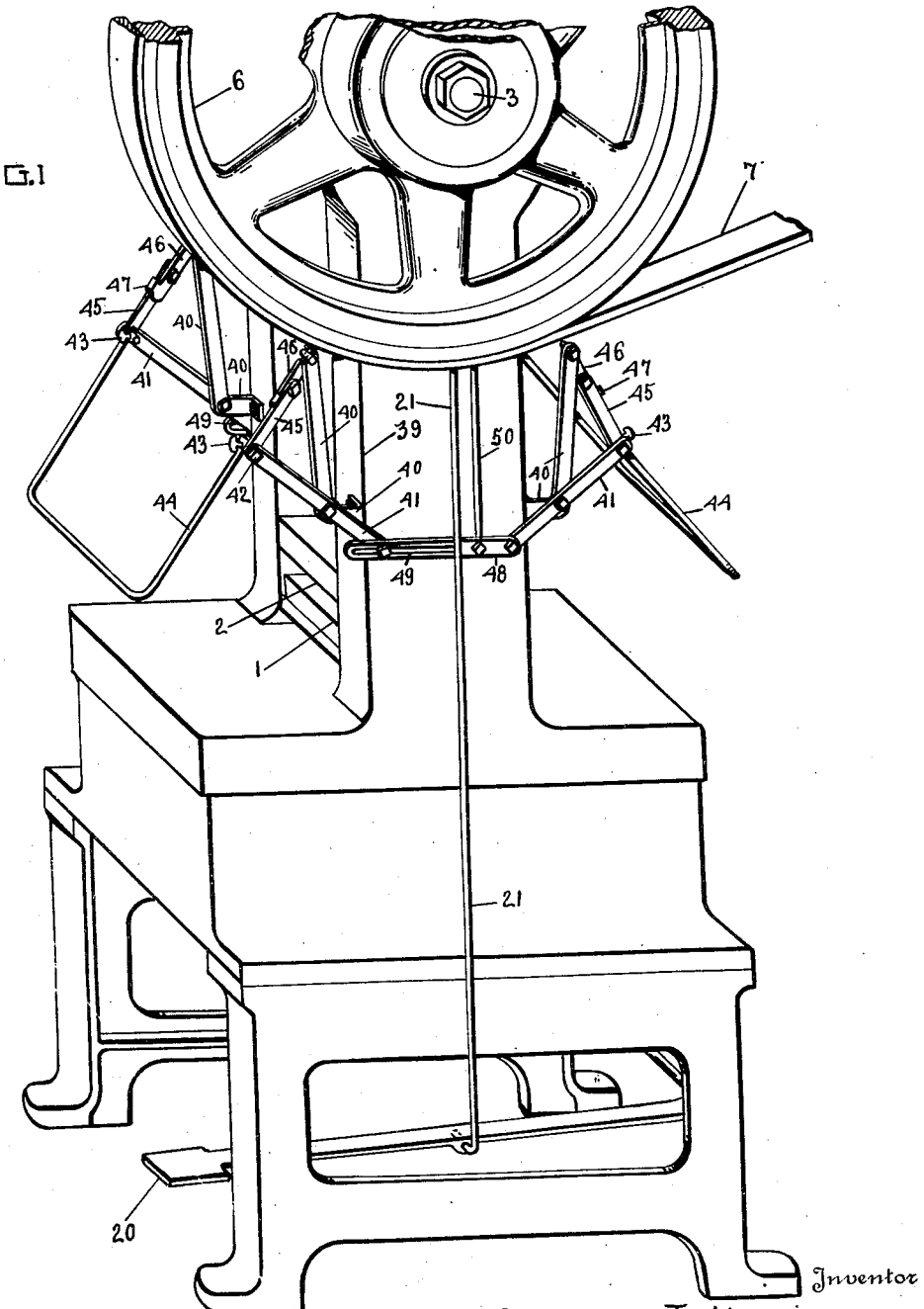

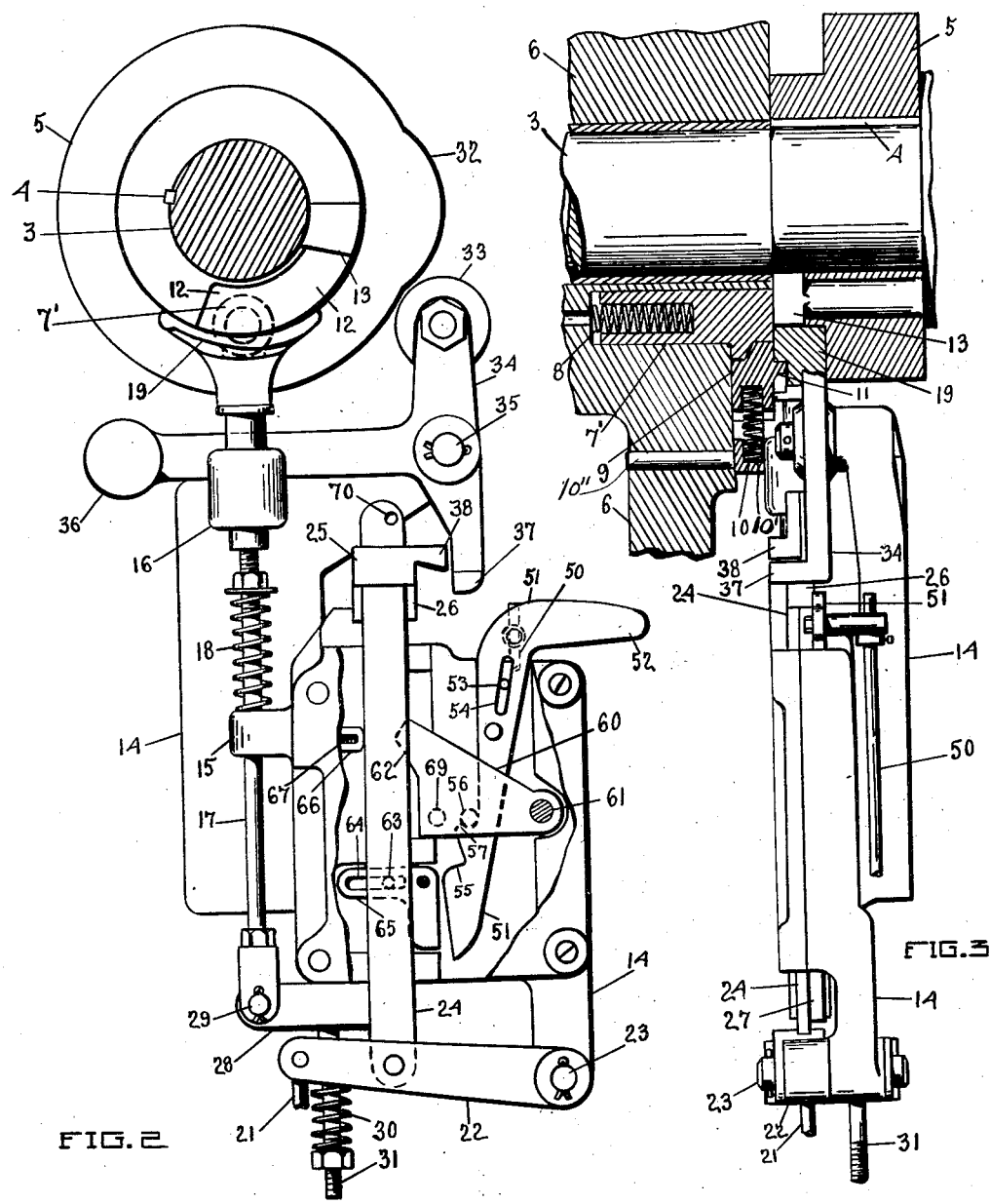

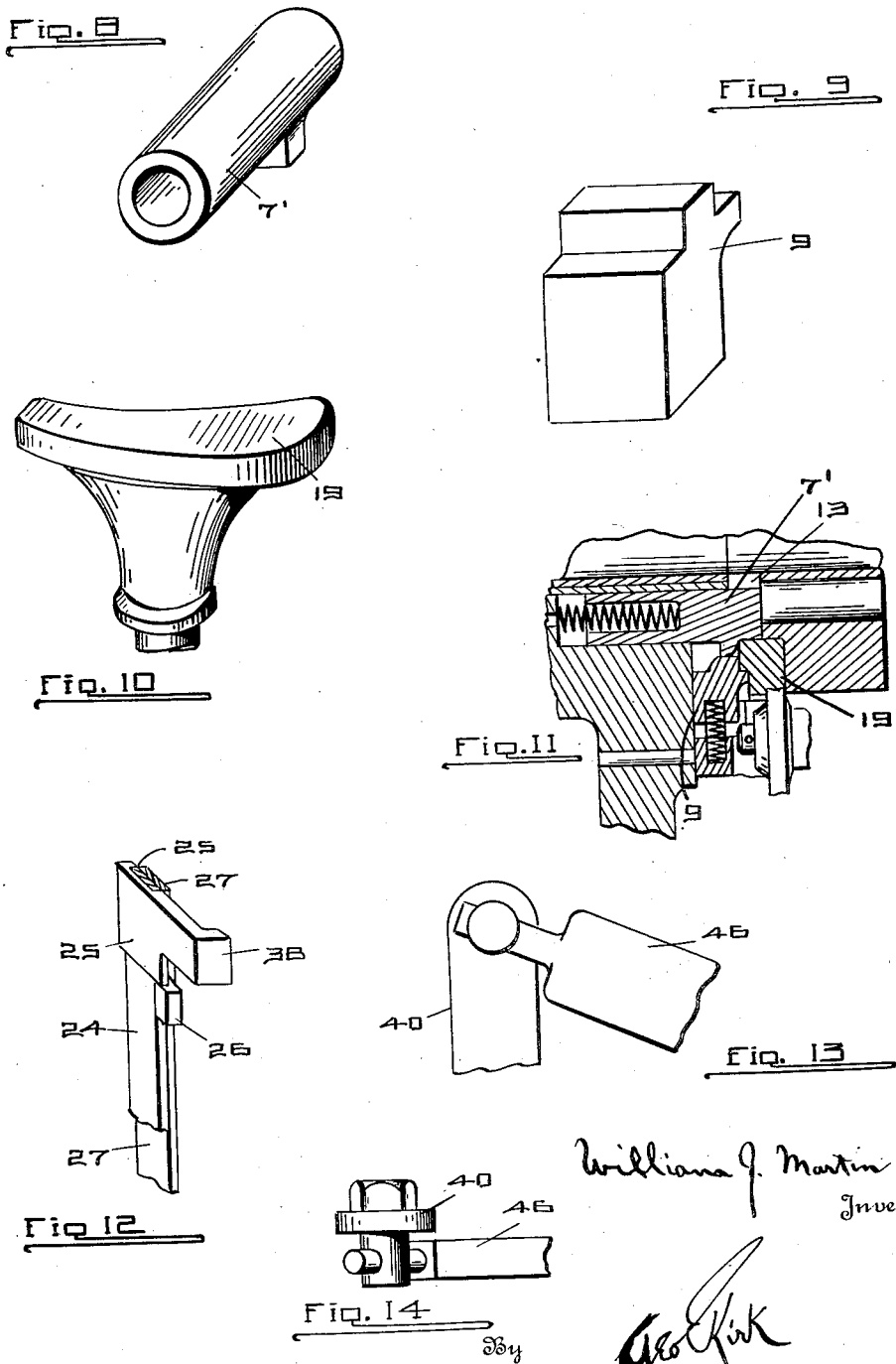

Patented Sept. 12, 1922.

1,428,966

UNITED STATES PATENT OFFICE.

WILLIAM J. MARTIN, OF TOLEDO, OHIO.

SAFETY DEVICE.

Application filed March 21, 1917. Serial No. 156,270.

*To all whom it may concern:*

Be it known that I, WILLIAM J. MARTIN, a subject of the King of Great Britain and Ireland, residing at Toledo, Lucas County, Ohio, have invented new and useful Safety Devices, of which the following is a specification.

This invention relates to automatic check and safety devices.

This invention has utility when incorporated in power control for machines, especially presses.

Referring to the drawings:

Fig. 1 is a fragmentary perspective view of an embodiment of the invention in a power press;

Fig. 2 is a fragmentary view in side elevation of the device in position as rotary member controlled;

Fig. 3 is a view partially in section of the device of Fig. 2 from the right, the rotary member being shown in a different position;

Fig. 4 is a fragmentary view of features of the lock-out control of the device;

Fig. 5 is a view similar to Fig. 2 with the parts in position about to be actuated in the automatic throw-off precluding a repeat of the cycle of operations;

Fig. 6 is a fragmentary side elevation showing the device as released by the means of the device illustrated in Fig. 4;

Fig. 7 is a section on the line VII—VII, Fig. 5;

Fig. 8 is a perspective view of the plunger or spring thrown clutch pin;

Fig. 9 is a perspective view of the clutch pin block;

Fig. 10 is a perspective view of the wedge trip for releasing the block and pin;

Fig. 11 is a fragmentary view in part section of the clutch pin in clutching position, with the trip entering to wedge the pin out;

Fig. 12 is a fragmentary perspective view of the safety device ledge members;

Fig. 13 is a fragmentary side elevation of the sliding pivot joint or bearing coacting to direct the guard; and Fig. 14 is a plan of the bearing of Fig. 13.

The power press may include the lower member 1 upon which the material to be acted upon is fed, and the opposing relatively traveling member 2 actuated from the rotary driven member or shaft 3 to cut or shape the material on the member 1. This shaft 3 has connected thereto by the spline 4 the collar 5, adjacent which is loosely mounted on the shaft 3, driving pulley 6, continuously driven by the belt 7. This driving pulley 6 may have a controllable clutch connection with the collar 5 for controlling the press in the cycle of operations. In this instance the cycle of operations may be one rotation of the shaft 3 for a complete reciprocation of the member 2.

As a means to this end, the pulley 6 may contain the plunger 7' normally urged by the spring 8 toward the collar 5. This travel of plunger 7' may be resisted by the dog 9 held in position by the spring 10, stepped in the seat 10' mounted by the pin 10'' in the driving pulley 6 (Fig. 3). This dog 9 may have the cam shoulder 11.

The collar 5 carries the guide face 12 terminating in the anvil 13 engaged by the head of the plunger 7' during driving actuation of the driven member 5 by the driving member 6. The plate 14 mounted on the frame of the press carries guide lugs 15, 16 for the rod 17 normally actuated by the adjustable spring 18 to carry its cam head 19 toward the shaft 3. This head 19 has its shoulder projecting toward the wheel 6 so that with this rod 17 shifted toward the shaft 3 by the spring 18, the rotation of the wheel 6 carries the shoulder 11 of the dog 9 outside of this head 19, but does not retract the dog 9 and accordingly keeps the plunger 7' out of clutch relation with the collar 5. However, if there has been clutch connection, disconnection is effected through the cam of this member 19 acting simultaneously on the plunger 7' and dog 9, upon the former to urge it against its spring 8 and upon the latter to permit it to come into holding position for maintaining this plunger 7' withdrawn.

In a convenient position for the operator is disposed controlling means or treadle 20 connected by the link 21 to the lever 22 fulcrumed on the pin 23 carried by the safety device frame 14. This lever 22 has upwardly extending therefrom the member 24 carrying the ledge element 25 normally resting on the ledge element 26 of the adjacent member 27 which extends downwardly parallel with the member 24 and has at its lower extremity the offset angle bar 28 connected by the pin 29 to the rod 17. Accordingly, a depression of treadle 20 pulls rod 21 and lever 22 abutting the spring 30 against the resistance of the adjustable spring 30 on the fixed pin 31 extending from the stationary plate 14 which pull of the rod 21 will act through the lever 22, members 24, 27, 28, rod 17 to withdraw the member 19 and dog 9 allowing the plunger 7 to be thrust toward the collar 5 and thereby ride on the guide 12 against the anvil 13 for rotating the shaft 3.

The collar 5 of the rotary member 3 in this cycle of rotation may carry its cam or swell portion 32 against roller 33 of the lever 34 fulcrumed on the pin 35 carried by the plate 14. This lever 34 has counter-weight 36 normally holding the member 33 against the collar 5. This lever 34 has the offset 37 rockable by the roller 33 from the swell 32 about the fulcrum 35.

With the treadle 20 held depressed by the operator during the cycle of operations or after the clutch connection for driving shaft 3, the rod 21 and lever 22 are held down against the resistance of spring 30. This also pulls down the member 24 and brings the ledge element 25 to have its jaw 38 engaged by the offset 37 in the rocking of this offset 37. This will cause sufficient shifting of the member 24 to the left as shown in Fig. 5 to have the ledge element 25 clear the element 26 so that the spring 18 may act in lifting not only the member 27, 28, but the rod 17 and with it the cam 19, thereby wedging the plunger 7' out of position behind the anvil 13 and into position to be engaged by the dog 9. There is, accordingly, an automatic throw-off disconnecting the rotary actuated shaft 3 from the driving means or pulley 6. In this action gravity dog 60 pivotally mounted by pin 61 in the frame 14 and riding against the member 27 at once drops into notch 62 for locking.

Mounted on the machine frame 39 are the brackets 40 carrying levers 41. Each lever 41 at its outward extremity carries the transversely extending relatively non-rotatable member 42 in which may be connected by set screw 43 the connector safety guard 44, herein shown as a U-bar. Pivotally connected to this non-rotatable member 42 is link 45 extending to link 46 having a reduced cylindrical upper end (Figs. 1, 4) slidable in the bearing in the upper end of the bracket 40.

This link 46 has the offset 47 limiting the swing of the link 46 as to the link 45. Accordingly, the operator in feeding material to the member 1 effects the rocking of the gravity held safety guard member 44. This inward rocking of the guard member 44 through the lever 41 rocks the links 45, 46 into shortening position and swings downward the lower end of the lever 41 to lower the link 48 having adjustable or slidable connection with the link 41 by the slot 49. This lowering of the link 48 acts upon the rod 50 which has set screw held pin, rockably connected to the dog 51.

The dog 51 has the counter-weighted end 52 normally holding its lower end thrown toward pin 56. As the rod 50 travels in lifting the dog 51, the dog 51 is guided by its pin 53 and slot 54. The downward movement of the dog 51 causes the clearing notch 55 to pass below the pin 56 and bring the notch 57 into position to engage the pin 56 of the dog 60 having the pivot bearing 61 carried in the frame member or plate 14.

The operator, having moved his arms into the press for feeding position and rocking the bar 44, in withdrawing his arms permits this gravity actuating guard member or bar 44 to rock back to normal position and in so doing this guard member 44 lifts the rod 50 and dog 51 effecting the lifting of the dog 60 out of the notch 62 in the member 27.

This dog 60 engaging the notch 62 holds the member 27, 28, and likewise the rod 17 in position for the cam member 19 to remain adjacent the shaft 3 and preclude the re-connection of the collar to the driving pulley 6 for the ledge elements 25, 26, hold the member 24 against depression of treadle 20. However, when this guard bar 44 is rocked inward and then outward, the dog 60 is released from holding the member 27 and the treadle 20 may be operated. This operation of the treadle not only withdraws the member 19 to permit a clutching of the pulley 6 to the collar 5 but the downward movement of the member 27 through the pin 63 carried by the member 27 engaging in the slot 64 of the rocking dog 65 causes this dog 65 to engage the lower end of the dog 51 and rock this dog 51 clear of the pin 56 on the dog 60 thereby allowing the dog 60 in its gravity fall to act automatically in re-entering the notch 62 in the member 27, upon the member 27 recovering its initial position either by release of the treadle 20 or through the offset 37 permitting the spring 18 to act in lifting the member 27.

The shifting of the member 24 by the offset 37 is resisted by the plunger 66 actuated by the spring 67 guided by the stem 68 anchored in the main plate 14.

The U-shaped guard bar 44 may be mounted in duplicate when the press is one with operators feeding or caring for material from opposite sides of the press. In this event the rocking of either member 44 inward brings the dog 51 down while the recover movement outward, through the dog 51 lifts the dog 60 from the notch 62.

In the safety device of this disclosure there is accordingly provision precluding press operation by the re-pressing of the treadle until the guard member 44 has been rocked in and out. Further, there is the safety provision precluding repeat of the cycle of operations of the machine, upon one depressing of the treadle 20, for the swell 32 automatically disconnects this depressed treadle allowing the clutch release device to act automatically, and lock the machine released.

Should it be desired to adapt the machine equipped with this device for operation independently of the guard member, pin 69 may be inserted under the lifted dog 60, holding the dog in raised or inactive position. Should it be desired to have certain machine operations independent of the single cycle, the lever 34 may be rendered inoperative for tripping by connecting the members 24 and 27 by a pin through the openings 70. The locking of the member 24 by the pin through openings 70 holds the offset 38 away from the offset 37 against the action of the spring 67 and the lever 34 is ineffective in its rocking past the swell or cam 32 to actuate the member 24. This leaves treadle 20 normally connected for direct actuation of the stem 17 at all times.

What is claimed and it is desired to secure by Letters Patent is:

1. In a power machine, a driven member, a driving member therefor, shiftable element for connecting the driving member to actuate the driven member, means actuable by the driven member for disconnecting the driving member from actuating the driven member, an engaging device for maintaining the driving member disconnected from the driven member, and device releasing control means operable separately from the shiftable element for setting the device to permit operation of the element.

2. In a power machine into which material is to be fed to be acted upon, a driven member, a driving member therefor, shiftable mechanism for connecting the driving member to actuate the machine, means actuable by the driven member for disconnecting the driving member from actuating the machine, an engaging device coacting upon disconnection shifting of the disconnection means for rendering the shiftable mechanism inoperative, and safety control means disposed for normal actuation by the operator separately from machine operation in feeding material to the machine, said control means coacting to release the device to permit the shiftable mechanism to be operable for effecting driving connection between the members.

3. A clutch control mechanism including a movable member, an actuator therefor, a latch normally coacting with the member to preclude repetition of movement thereof, and control means actuable separately from the mechanism for operating the latch to release the member, said actuator in member shifting movement being independent in its travel of any shifting of the control means.

4. In a clutch control mechanism for actuating a driven member from a driving member including a reciprocable member, a latch normally coacting to hold the member at a limit of its movement, driven member actuated means normally laterally shifting the reciprocable member for freeing the reciprocable member from latch held position, and control means manually actuable separately from the mechanism for shifting the latch to release the member.

5. A clutch control mechanism including a movable member, a pedal for shifting the member, means for effecting recover of the member from pedal shifting, a latch for holding the member recovered, and control means movable separately from the pedal and actuable independently of the member for releasing the latch for rendering pedal shifting effective.

6. A clutch control mechanism including a movable member, an actuator therefor, a trip for rendering the actuator inoperative, there being means for re-setting the trip, a latch coacting for holding the member from actuator operation, and control means actuable separately from the member for releasing the latch.

7. A clutch control mechanism including a movable member, an actuator therefor, a trip for rendering the actuator inoperative, yieldable means normally tending to connect the actuator and member, an engaging device coacting for holding the member against movement, and control means for the device operable separately from the ctuator to render the actuator effective for moving the member.

8. A clutch control mechanism including a movable member, an actuator therefor, a trip for rendering the actuator inoperative, yieldable means normally tending to connect the actuator and member, an engaging device coacting for holding the member against movement, control means for the device operable separately from the actuator to render the actuator effective for moving the member, and release means operable from the actuator for shifting the control means to free the device from held position.

9. A clutch control mechanism including a movable member, an actuator therefor, a trip for rendering the actuator inoperative, yieldable means normally tending to connect the actuator and member, a weighted latch coacting for holding the member against movement, control means for the latch operable separately from the actuator to render the actuator effective for moving the member, and release means operable from the actuator for shifting the control means to free the latch from held position.

10. A pair of clutch elements, clutch control mechanism therefor, including a clutch control member, a spring normally urging the member into position to intercept travel of the clutch elements into clutching relation, a guide for the spring actuated member, a first reciprocable bar connected to the member, a second guide holding the first bar in said bar reciprocation to travel parallel to the member, a second bar connected to the first bar and operable for moving the first bar against action of the spring, clutch element actuated means for shifting the second bar as to the first bar in disconnecting the bars from each other to permit the spring to urge the clutch control member into position to intercept travel of the clutch elements into clutching relation, and a latch for holding the first bar and through said bar said member against shifting.

11. A pair of clutch elements, clutch control mechanism therefor, including a clutch control member, a spring normally urging the member into position to intercept travel of the clutch elements into clutching relation, a guide for the spring actuated member, a first bar connected to the member, a second guide holding the bar to travel parallel to the member, a second bar connected to the first bar and operable for moving the first bar against action of the spring, clutch element actuated means shifting the second bar away from connecting relation as to the first bar, yielding means resisting such shifting of the second bar, and a stationary mounting for the yielding means.

12. A pair of clutch elements, and clutch control mechanism therefor, including a clutch control member normally urged into position to preclude clutching relation of the elements, a guide for the member, a first bar connected to the member, a second bar tripably connected to the first bar for one way movement of the first bar, a latch for holding the first bar against movement, and a device for shifting the first bar clear of the latch independently of actuating the bar through the latch.

13. A pair of clutch elements, and clutch control mechanism therefor, including a clutch control member normally urged into position to preclude clutching relation of the elements, a first bar connected to the member, a second bar tripably connected to the first bar for one way movement of the first bar, a latch for holding the first bar against movement to permit reconnecting of the clutch elements, a device for shifting the second bar into released position for movement independently of the latch, and control means having a catch for effecting said releasing movement of the latch.

14. A pair of clutch elements, and clutch control mechanism therefor including a clutch control member normally urged into position to preclude clutching relation of the elements, a first bar connected to the member, a second bar tripably connected to the first bar for one way movement of the first bar, a latch for holding the first bar against movement, control means having a catch for moving the latch clear of the bar, and release means actuable from the first bar for throwing the control catch away from holding position as to the latch.

15. A pair of clutch elements, and clutch control mechanism therefor, including a clutch control member normally urged into position to preclude clutching relation of the elements, a first bar connected to the member, a second bar tripably connected to the first bar for one way movement of the first bar, a latch for holding the first bar against movement, control means having a catch for moving the latch clear of the bar, and rocker means actuable from the first bar for throwing the control catch away from holding position as to the latch.

16. A clutch control mechanism for effecting driving connection between driving and driven members including a clutch control member, a guide for the member, a bar connected to the member and depressible to actuate the member in one direction, an engaging device, said driven member being provided with means to engage the depressed bar at each operation of the mechanism, and control means operable separately from the driven member for moving the released bar to be free of the device.

17. A clutch control mechanism, including a clutch control member, a bar connected to the member to actuate the member in one direction, an engaging device, first control means for actuating the device to permit this device to engage the bar, and second control means operable separately from the member for moving the device to free the bar.

18. A power machine tool safety device, including clutch control mechanism, having a lock set by the mechanism to hold the mechanism against reoperation, and control means embodying a guard shiftable by the operator separately from the clutch mechanism for controlling such lock to permit reoperation of the mechanism.

19. A power machine tool safety device, including control means embodying a guard to be actuated by a machine operator, and a clutch control mechanism operable separately from the control means, said mechanism including a holding lock for the mechanism, said lock having a gravity latch, said control means including a lifter for the latch.

20. A power machine tool safety device, including control means embodying a guard to be actuated by a machine operator, and clutch control mechanism including a latch, and means freeing the latch from the control means to permit the latch to lock the mechanism when the mechanism has functioned as permitted by the control means.

In witness whereof I affix my signature.

WILLIAM J. MARTIN.